J. AND D. H. WELLER.
N. WELLER, ADMINISTRATRIX OF J. WELLER, DEC'D.
AUTOMOBILE RADIATOR.
APPLICATION FILED JAN. 28, 1919.
1,356,676.
Patented Oct. 26, 1920.
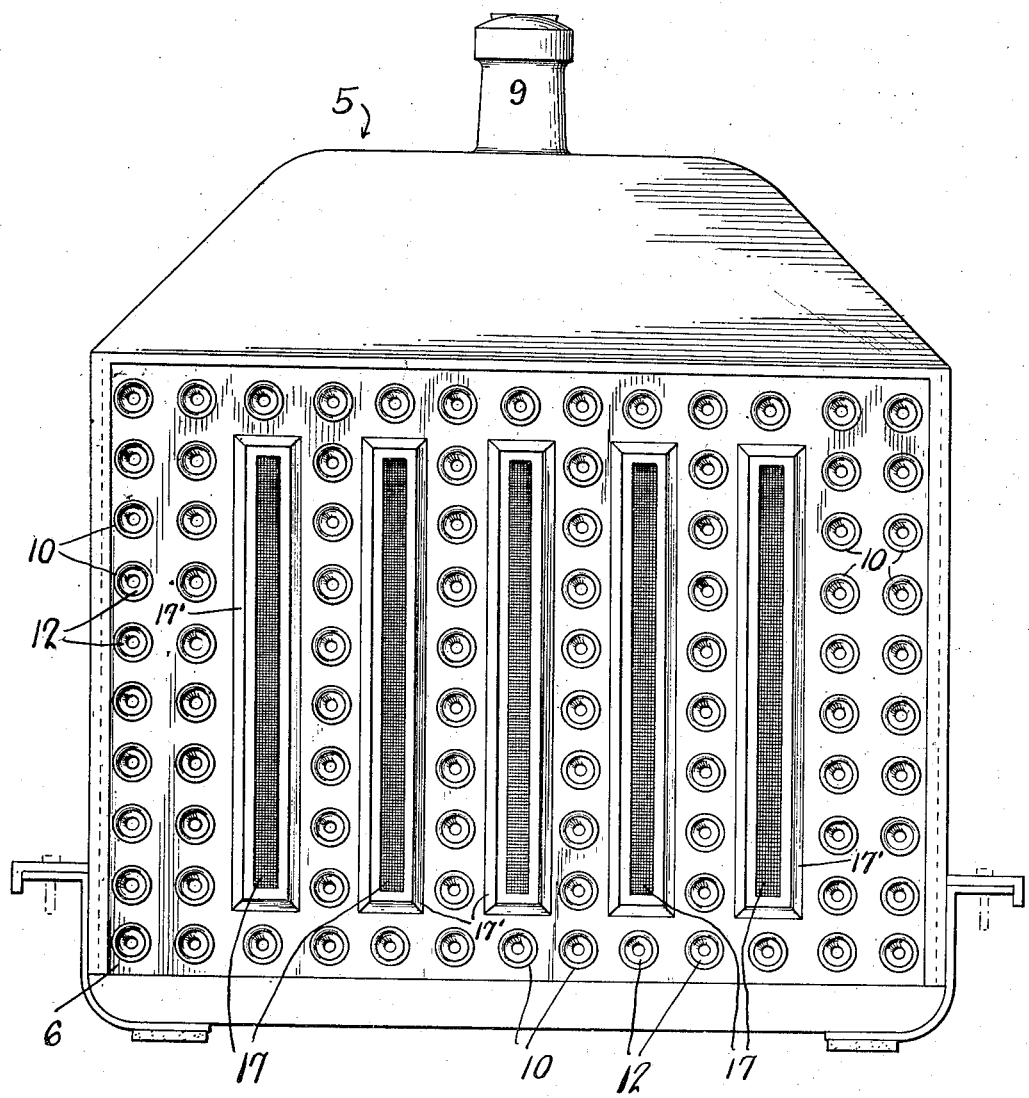
Jacob Weller
David H. Weller
Inventors

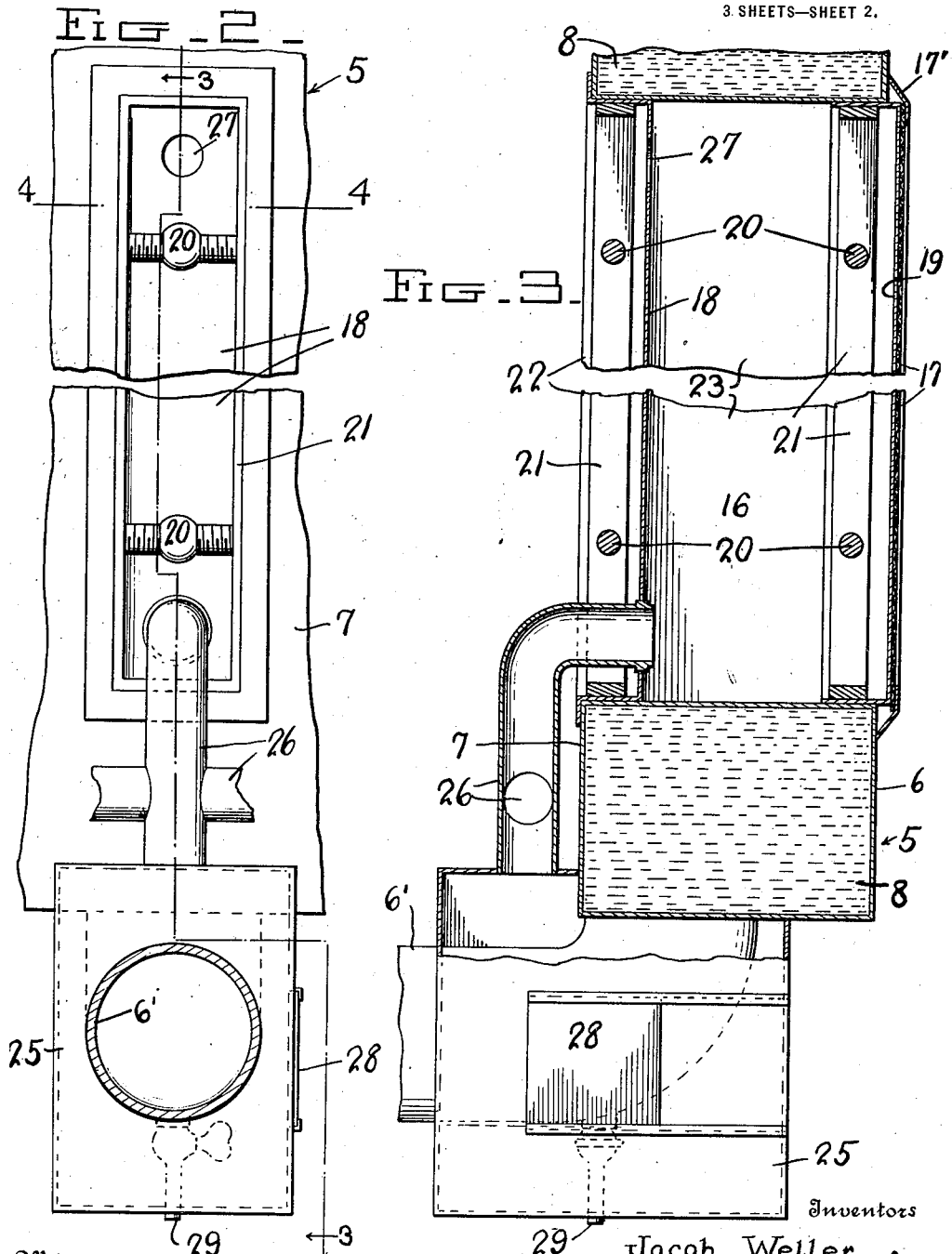

J. AND D. H. WELLER.
N. WELLER, ADMINISTRATRIX OF J. WELLER, DEC'D.
AUTOMOBILE RADIATOR.
APPLICATION FILED JAN. 28, 1919.
1,356,676.   Patented Oct. 26, 1920.
3 SHEETS—SHEET 3.
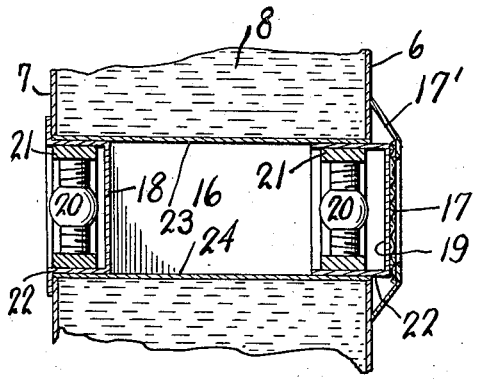
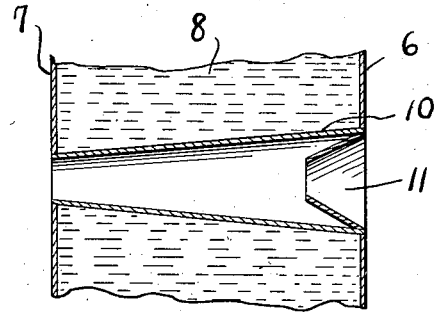
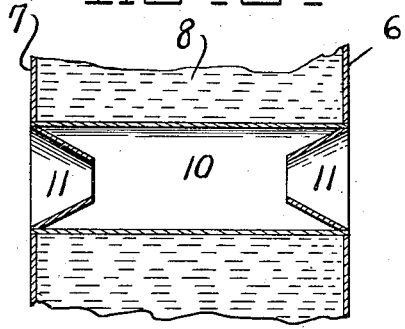
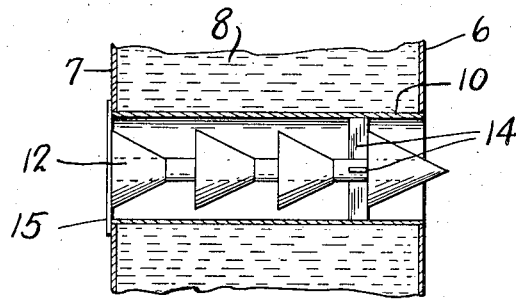
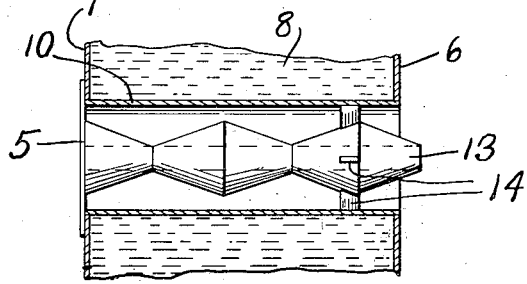
Inventors
Jacob Weller &
David H. Weller

UNITED STATES PATENT OFFICE.

JACOB WELLER, DECEASED, BY NETTIE WELLER, ADMINISTRATRIX, OF KANSAS CITY, MISSOURI, AND DAVID H. WELLER, OF KANSAS CITY, MISSOURI.

AUTOMOBILE-RADIATOR.

1,356,676.  Specification of Letters Patent.  Patented Oct. 26, 1920.

Application filed January 28, 1919. Serial No. 273,669.

*To all whom it may concern:*

Be it known that JACOB WELLER, late a citizen of the United States, now deceased, and DAVID H. WELLER, a citizen of the United States, residing at Kansas City, in the county of Jackson and State of Missouri, have invented new and useful Improvements in Automobile - Radiators, of which the following is a specification.

This invention relates to radiators and more particularly to automobile radiators.

The primary object of this invention resides in the provision of an automobile radiator which will maintain the water therein at a normal temperature regardless of climatic variations.

Another object of this invention resides in the provision of an automobile radiator having means for distributing heat to various sections of the radiator to retain the water within the same in a liquid state during freezing weather.

A still further object of this invention resides in the provision of an automobile radiator having means for deflecting the currents of air passing therethrough against the walls of the air tubes.

A still further object of this invention resides in the provision of an automobile radiator having chambers therein which are adapted to be utilized to either confine heat therein during freezing weather or permit the direct passage of cool air therethrough during mild weather.

With these and other objects in view this invention resides in certain novel features of construction and arrangement of parts which will be more fully set forth in the specification and pointed out in the appended claims, it being understood that the right is reserved to resort to such departures from the present disclosure as comes within the scope of the claims.

In the accompanying drawings:—

Figure 1 is a front view of an automobile radiator as constructed in accordance with this invention;

Fig. 2 is an enlarged view of a portion of the automobile radiator looking from the rear thereof toward one of the heat chambers;

Fig. 3 is a vertical sectional view on line 3—3 of Fig. 2;

Fig. 4 is a detail horizontal sectional view on line 4—4 of Fig. 2;

Fig. 5 is a detail horizontal sectional view through one form of air tubes employed in the construction of this radiator;

Figs. 6, 7 and 8 are similar views showing modified forms of the air tubes employed in the construction of this radiator.

In the present embodiment of this invention the numeral 5 designates an automobile radiator which consists of spaced front and rear walls 6 and 7 between which is formed a water reservoir 8 that is supplied with water through the usual filling tube 9.

Securely fastened to the aforesaid front and rear walls of the radiator in any approved manner is a plurality of air tubes 10 which permit the passage of air therethrough as the automobile advances and in order that the velocity of the inrushing air may be retarded and deflected against the walls of the tubes, they are either constructed, as illustrated in Fig. 6, or provided with suplemental deflectors 11, 12 and 13 as shown in Figs. 5, 7 and 8.

The deflectors as shown in Figs. 7 and 8 are retained in the centers of the tubes by radially extending arms 14 secured thereto and are held in operative positions by wires 15, or other suitable means, that are fastened to the rear wall of the radiator in such manner that the deflectors can be readily removed when desired. In the employment of these deflectors the air currents that would ordinarily pass directly through the tubes are agitated and directed against the inner surfaces of the walls of the tubes and since the entire volume of inrushing air is directed against the aforesaid walls of the tubes, it is apparent that the temperature of the water in contact with the tubes will be quickly lowered.

To further maintain the water within the radiator at a normal temperature, the radiator is provided with a plurality of chambers 16 which are preferably of considerable area in comparison with the aforesaid tubes to contact with a large volume of water. These chambers extend from the front to the rear of the radiator and have inlet ends that are closed by reticulated material such as fine mesh wire 17 which is secured to projecting flanges 17' fastened to the front wall of the radiator.

During mild weather the aforesaid chambers are entirely unobstructed with the exception of the aforesaid reticulated material, but during freezing weather, closures 18 and 19 are removably secured at the exit and inlet ends thereof by turn buckles 20 which expand the sides of metallic bands 21 against the flanges 22 of the closures and force them against the walls 23 and 24 of the chambers 16. The structure of the chambers 16 is more clearly shown by reference to Figs. 2, 3 and 4, it being noted as above stated, that when it is desired to employ the closure plates 18 and 19, that the plate 19 is first inserted in the front end of the opening 16 in position to be engaged by the screen 17 and the retaining flange 17'. The metallic band 21, being of rectangular form is inserted within the side walls 22 of the member 19 and by operating the turn buckle 20, the opposite sides of the band 21 slightly expand the sides 22 of the member 19 for frictional contact with the side walls 23 and 24 of the opening 16. With this arrangement the closure plates 19 are securely retained in position in the forward ends of the opening 16 against displacement and any possible vibration, it being noted that the plate 19 is forwardly positioned relative to the band 21 and turn buckle 20 to prevent any passage of air through the openings 16. The rear end of the opening has the closure member 18 received therein and limited in its forward movement by the radial flanges engaging the rear wall 7 of the radiator as indicated in Fig. 4, while a rectangular band 21 similar to the aforementioned band is positioned rearwardly of the plate 18 with the sides thereof in engagement with the sides 22 of said member 18 and by operation of the turn buckle 20 the sides of the rearwardly positioned band hold the band and rear closure member securely in position in the rear open end of the chamber 16 thus to seal the chamber against the passage of the air therethrough.

The numeral 6' designates a water outlet pipe for the radiator, connected with the lower portion thereof, and the lower portion of the water jacket of the engine. A heat box 25 surrounds the forward portion of this pipe 6', and the air contained therein is heated by the water contained in the forward portion of the pipe 6'. Heat conduits 26 are connected with the upper portion of the heat box and the lower portions of the chamber 16. The heated air is thus discharged into the lower portions of the chambers 16, and discharges from the upper ends thereof, through openings 27, which discharge is aided by the usual fan disposed rearwardly of the radiator. The passage of the heated air through the chambers 16, in cold weather, would aid in maintaining the water in the radiator, suitably warm.

With this method of supplying heat to a plurality of heat chambers, it is apparent that a large volume of water can be maintained at approximately a normal temperature for the warm air currents are kept in circulation by the suction fan usually employed with radiators of this type.

The aforesaid heat box is provided with a sliding door 28 whereby access to the petcock 29 on the pipe 6' is had when it is desired to drain the radiator.

With this invention fully set forth it is manifest that a radiator is produced which is cheap of manufacture, readily adapted for the purpose of its introduction, ornamental in appearance and easily repaired by any one familiar with soldering tools.

Having thus described this invention what we claim is:

1. In an automobile radiator of the character described, the combination of a plurality of air chambers, reticulated elements forming the front walls of said air chambers, closures for said air chambers, heat supplying means in communication with said air chambers, and means securing said closures in said air chambers.

2. In an automobile radiator of the character described, the combination of a plurality of air chambers, reticulated elements forming the front walls of said air chambers, closures for said air chambers, a heat box, heat conduits between said heat box and air chambers, and means removably securing said closures in said air chambers.

3. In an automobile radiator of the character described, the combination of a plurality of air chambers extending through the radiator, reticulated elements forming certain walls of said air chambers, spaced closures for said air chambers, flanges on said spaced closures, bands contacting with said flanges, expansible elements contacting with said bands, a heat box, and heat conduits between said heat box and air chambers.

In testimony whereof, we have hereunto set our hands in the presence of two subscribing witnesses.

NETTIE WELLER,
*Administratrix of Jacob Weller, deceased.*
DAVID H. WELLER.

Witnesses:
  D. L. JUSTUS,
  A. L. GORDON.